United States Patent [19]
Look

[11] Patent Number: 5,655,259
[45] Date of Patent: Aug. 12, 1997

[54] CASTER ASSEMBLY

[76] Inventor: Dick J. Look, 1415 C 47th Ave., Sacramento, Calif. 95822

[21] Appl. No.: 717,579

[22] Filed: Sep. 23, 1996

[51] Int. Cl.$^6$ ............................ A47B 91/06; B60B 33/00
[52] U.S. Cl. ............................ 16/42 R; 16/45; 16/18 CG; 16/20
[58] Field of Search ............................ 16/42 R, 45–48, 16/25, 29, 18 CG, 31 R, 40, 43, 24, 21, 18 R

[56] References Cited

U.S. PATENT DOCUMENTS

| | | | |
|---|---|---|---|
| 3,559,802 | 2/1971 | Eidus | 16/18 R |
| 3,739,894 | 6/1973 | Hinman | 16/26 |
| 3,858,271 | 1/1975 | Howard et al. | 16/42 R |
| 4,224,714 | 9/1980 | Seipos | 16/21 |
| 4,554,704 | 11/1985 | Raffaeli | 16/18 R |
| 4,777,697 | 10/1988 | Berndt | 16/21 |

Primary Examiner—Chuck Y. Mah
Attorney, Agent, or Firm—John P. Costello

[57] ABSTRACT

An improved caster assembly for moving heavy loads upon a caster platform. This caster assembly is less prone to breakage than conventional caster assemblies, and additionally incorporates a safety lid for reducing the risk if injury to workers. This caster assembly is comprised of a box frame member within which a caster wheel is rotatably mounted. The box frame member is coupled in an offset position to a rotatable platform, which allows the caster assembly to rotate with the direction of force applied to a load moving across a caster platform in which it is mounted. This caster assembly is designed to couple into cavities present in existing caster platforms. The safety lid serves to close any gaps present in these platform cavities, thereby reducing the likelihood of a worker's foot or hand becoming caught in the cavity and injured by an approaching heavy load.

9 Claims, 5 Drawing Sheets

CASTER ASSEMBLY

BACKGROUND OF THE INVENTION

1. Field of the Invention

This invention pertains to caster platforms for moving large and heavy objects, and more specifically, to an improved caster assembly for placement into caster platforms.

2. Description of the Background Art

Industrial caster platforms are in use in many industries where large, heavy, loads must be moved around a work area. For example, caster platforms have been in use in large cargo aircraft for a number of years in the form of "roll-on", "roll-off" designs, wherein the individual caster wheels are fixed to the platform and do not rotate or move. This type of caster platform is useful in aircraft because the heavy loads merely have to be moved in a straight line into, or out of, the confined space of an aircraft fuselage.

However, for industrial settings, such as in a factor or trucking company, caster platforms must have the ability to move a large load across a wide factory or warehouse floor. To these ends, it is necessary for the individual caster assemblies to be able to rotate, and thereby rotate with the force applied to a load as it moves. In this manner, the load can be moved straight, rotated 360 degrees, or moved diagonally across the caster platform, to a desired destination on a warehouse, or factory floor.

A typical rotatable caster assembly has a rotatable, circular platform, with a pair of offset extension members, between which is mounted a caster wheel. An example of this typical caster structure is seen in U.S. Pat. No. 4,777,697 issued to Berndt. It has been found that when this type of caster design is used in heavy-duty industrial caster platforms, that the extension members often fatigue, and break, upon being repeatedly contacted by heavy loads. The result is that traffic traveling over the caster platform must be halted, while the broken casters are replaced.

Additionally, concurrent with their design, caster assemblies in present use rotate within a radius defined by the outermost surface of the caster wheel. In practice, this means that the caster assembly rotates within a "cup-like" cavity present within the caster platform. This cavity presents a safety hazard as the areas not occupied by the caster wheel, or extension members, represents open space, in which a worker can inadvertently step, and injure himself.

Therefore, it would additionally be desirable for a caster assembly to have a design wherein any open spaces present in these cavities are covered, thereby significantly reducing the possibility of injury to a worker.

The present invention has solved the foregoing deficiencies by providing a caster assembly for caster platforms which eliminates the use of extension members seen typical caster designs, and which furthermore, incorporates a safety lid which helps protect a worker from accidents on the caster platform.

The foregoing patent and other information reflects the state of the art of which the inventor is aware, and is tendered with a view toward discharging the inventor's acknowledged duty of candor in disclosing information which may be pertinent with regards to the patentability of the present invention. It is respectfully stipulated, however, that the disclosed patent and other information does not teach or render obvious, singly or when considered in combination, the inventor's claimed invention.

SUMMARY OF THE INVENTION

By way of example and not of limitation, the present invention pertains to a caster assembly for industrial caster platforms, which significantly reduces the incidence of breakage common with current designs. This invention eliminates the usage of extension members, which are prone to fatigue and breakage, and replaces them with a low-profile box frame member, within which the caster wheel is mounted. The four-sided box frame member presents a sturdy mounting structure for the caster wheel to reside in.

The box frame member is affixed to a rotatable platform assembly, which can be made to rotate in a number of feasible ways, but the preferred method of practicing the invention has the rotatable platform comprised of a round top plate member, a round bottom plate member, and a bearing means disposed between the top and bottom plate members. In this manner, the top plate with box frame member attached thereto rotates separately from the bottom plate.

A safety lid which is rotatable between an opened, and closed position, is coupled to the box frame member using a hinge means. The safety lid includes a cutout for accommodating the caster wheel, which protrudes slightly above the box frame member and safety lid when in a closed position.

Finally, the caster assembly is fastened within the cavity of a caster platform through common coupling means, such as through a bolt and nut arrangement. This caster assembly will be more fully understood through the following objects and advantages:

An object of the invention is to provide a rotatable caster assembly for use in caster platforms, which is substantially resistant to breakage.

Another object of the invention is to provide a caster assembly which has a safety lid for helping prevent worker accidents.

Still another object of the invention is to provide a caster assembly which can be readily placed into existing caster platforms.

Further objects and advantages of the invention will be brought out in the following portions of the specification, wherein the detailed description is for the purpose of fully disclosing preferred embodiments of the invention, without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
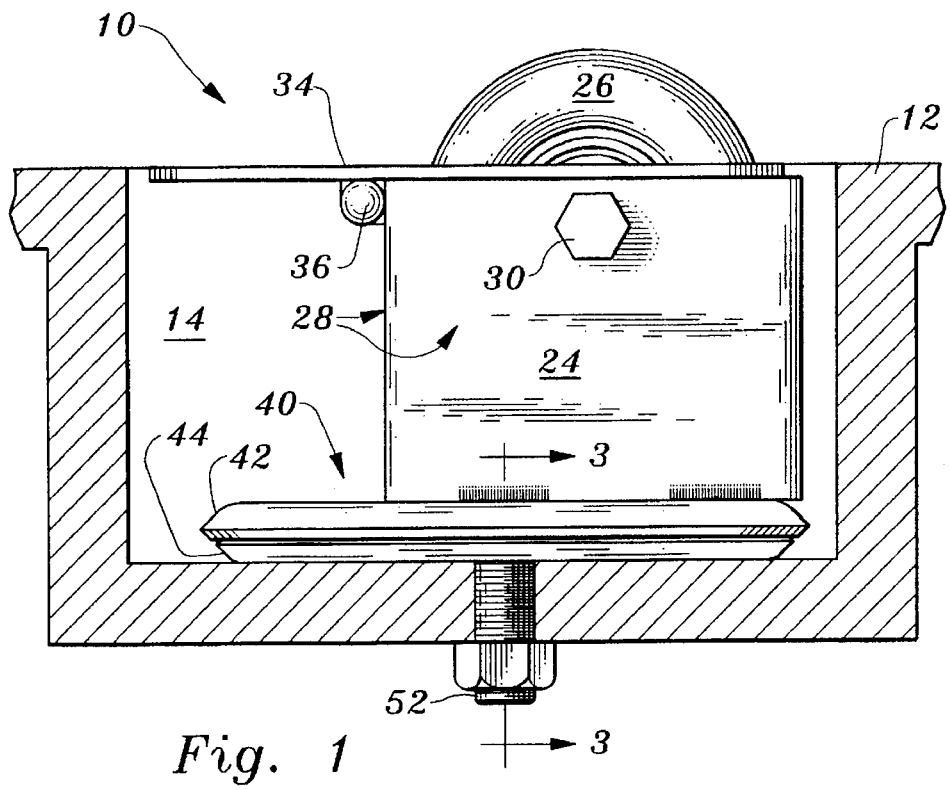
FIG. 1 is side cutaway view of a section of a caster platform, showing the present invention coupled therein.

Referring more specifically to the drawings, the caster assembly 10 which is the present invention is shown coupled to a caster platform 12 in FIG. 1. Caster assembly 10 rotates a full 360 degrees in caster platform 12, which is useful for moving heavy loads, in any desired direction, upon caster platform 12. Caster assembly 10, is designed to insert into cavities 14 present in existing caster platforms 12, and to replace prior art caster assemblies 16, having extension members 18, of the type depicted in FIG. 2.

Figure 2:
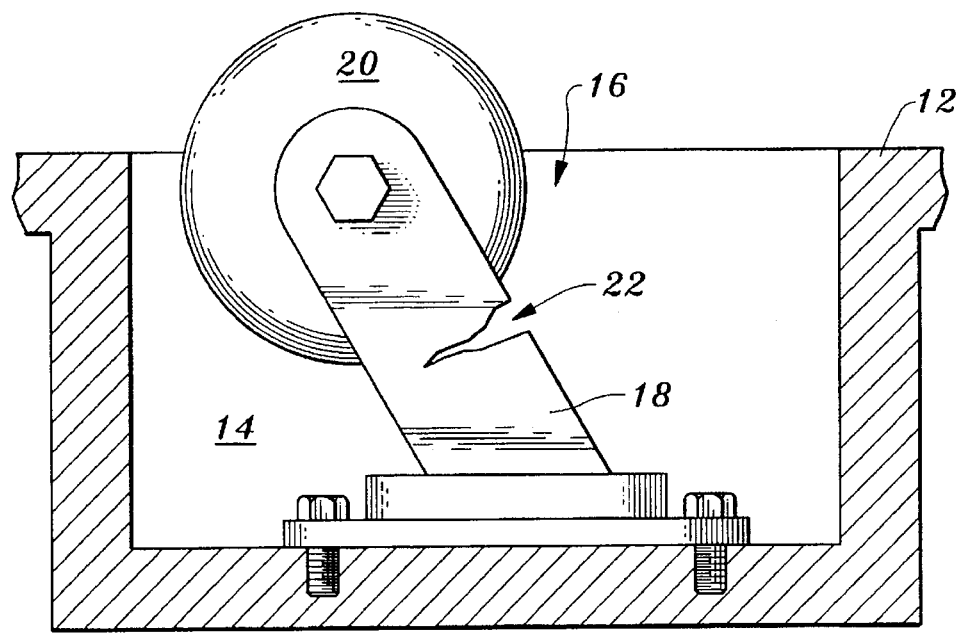
FIG. 2 is a side cutaway view of a section of a caster platform showing a prior art rotatable caster assembly breaking in characteristic fashion.

FIG. 2 additionally illustrates the problem associated with prior art caster assemblies 16. Extension members 18, which hold caster wheel 20 in placer tend to fatigue upon caster wheel 20 experiencing repeated contact with heavy loads. This fatigue leads to breakage 22 of extension members 18, as shown.

Figure 3:
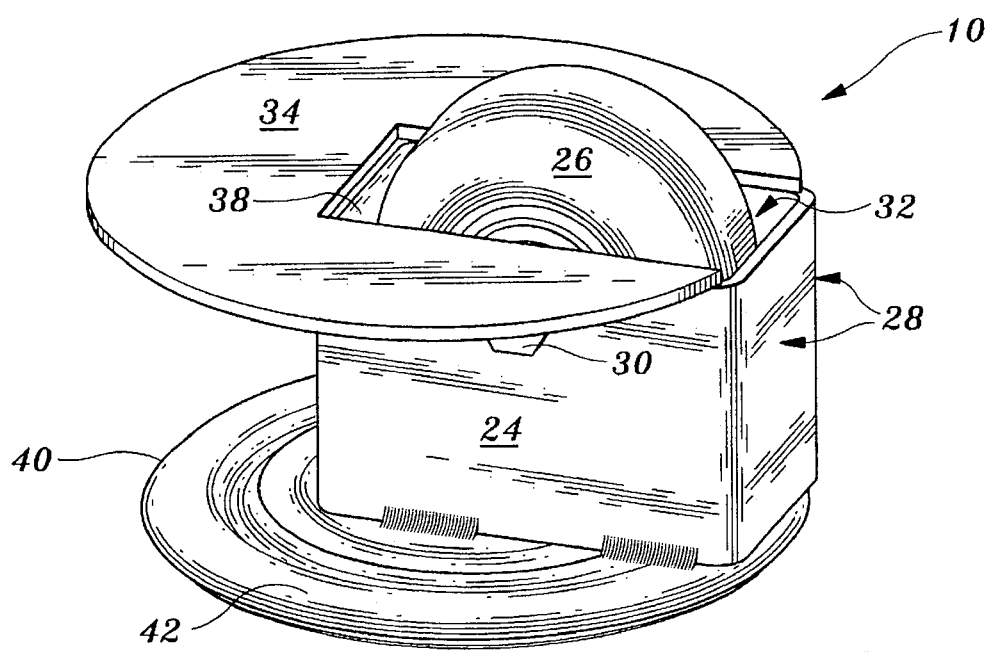
FIG. 3 is a perspective view of the caster assembly which is the present invention.

FIG. 3 shows a detailed perspective view of the present invention. Unlike the caster assembly 16 shown in FIG. 2, the present invention employs a four-sided box frame member 24, rather than extension members 18, for holding caster wheel 26 in place. The result is that box frame member 24 presents a low and sturdy structure for housing caster wheel 26, which substantially resists breakage from contact with heavy loads.

Figure 4:
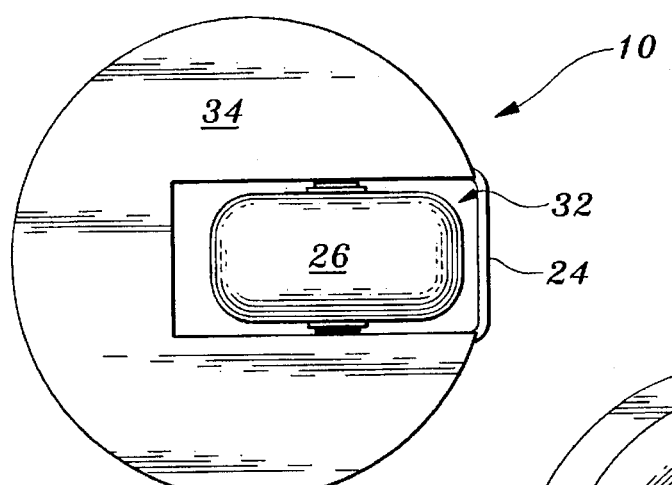
FIG. 4 is a plan view of the caster assembly depicted in FIG. 3, showing the safety lid in a closed position.
Figure 5:
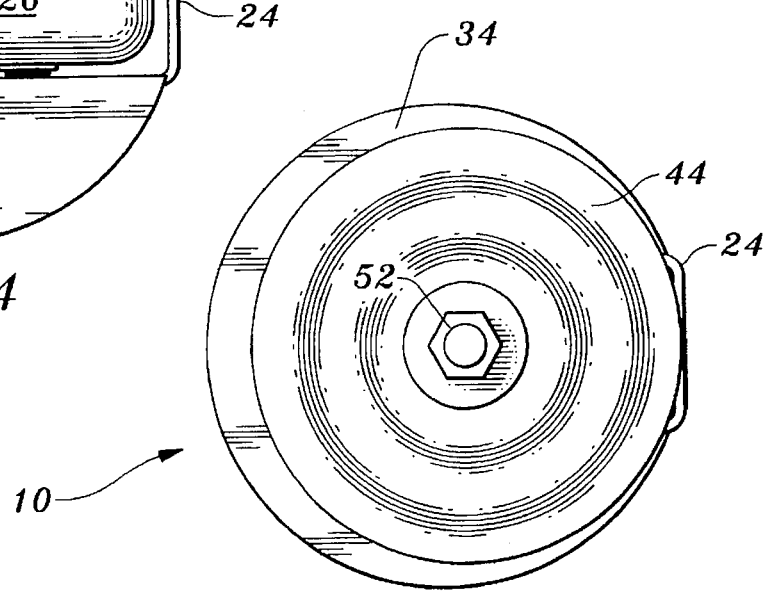
FIG. 5 is a bottom view of the caster assembly depicted in FIG. 3.
Figure 6:
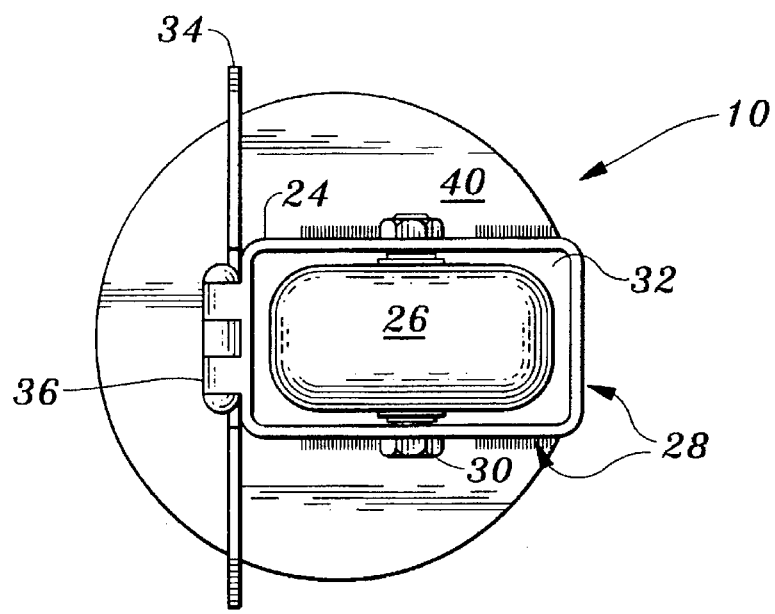
FIG. 6 is plan view of the caster assembly depicted in FIG. 3, showing the safety lid in an open position.

FIGS. 4-8 illustrate complete views of all the structural features of caster assembly 10. As shown, box frame member 24 is comprised of four walls 28 wherein caster wheel 26 is rotatably supported on an axle means 30 within the hollow cavity 32 formed by walls 28, the axle means mounted in two opposing walls 28. A safety lid 34 preferably couples to the top of box frame member 24 via hinge means 36, and can alternate between a closed position as shown in FIG. 4, or an open position, as shown in FIG. 6. When caster assembly 10 is placed into cavity 14 of caster platform 12, safety lid 34 effectively provides a flat surface covering cavity 14, thereby reducing the possibility that a worker's foot, or hand, would become caught in cavity 14, and damaged by an approaching heavy load. Safety lid 34 has a cutout 38 imparted forwardly therein, for intimately surrounding caster wheel 26, while in a closed position. Caster wheel 26 protrudes slightly above the surface box frame member 24 and safety lid 34 when closed, so that heavy loads can be easily contacted by caster wheel 26 and thereby directionally rolled upon caster assembly 10.

Figure 7:
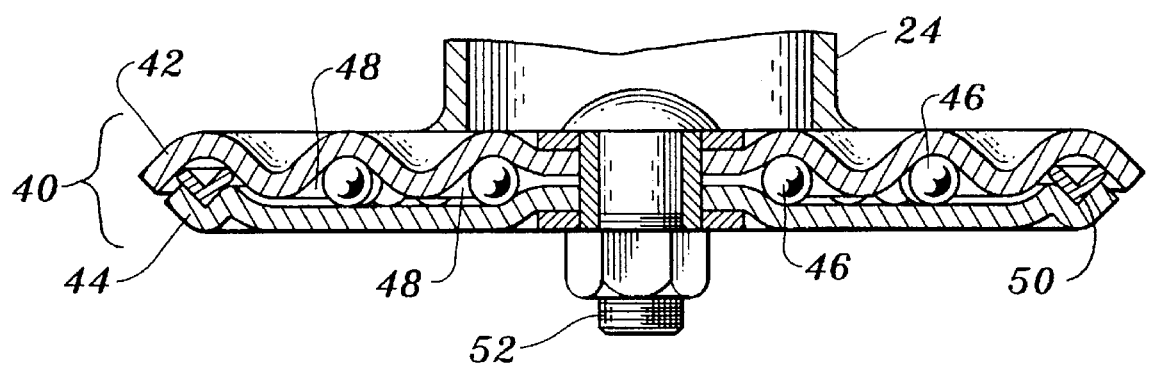
FIG. 7 is a closeup cutaway view of the preferred bearing means.
Figure 8:
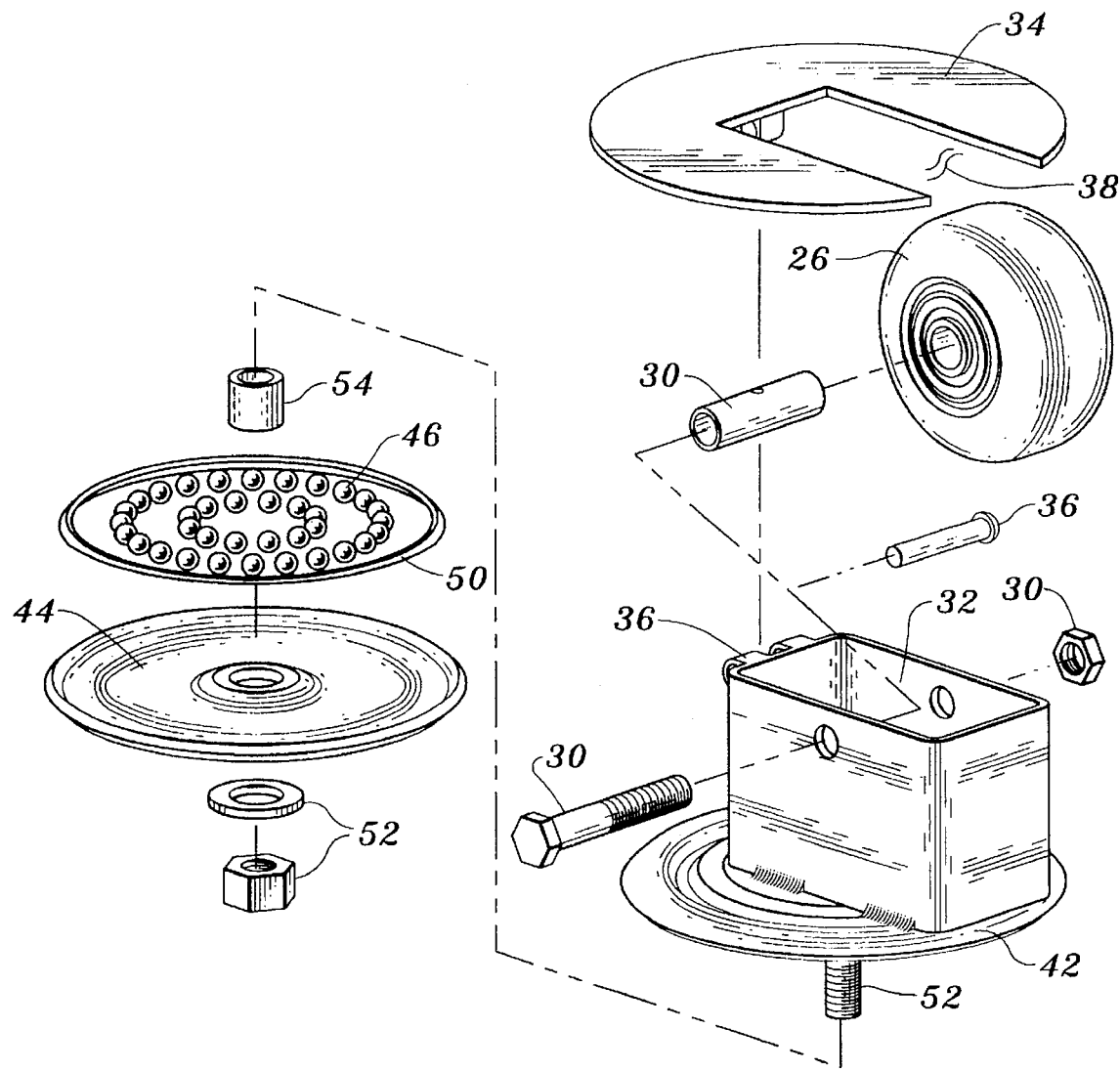
FIG. 8 is an exploded view of the caster assembly which is the present invention.

Box frame member 24 is meant to rotate freely and to these ends, box frame member 24 is affixed in an offset manner to a rotatable platform means 40 preferably comprised of a circular top plate 42, a circular bottom plate 44 and a bearing means disposed between the top and bottom plates. Bearing means allows top plate 42 to rotate freely upon bottom plate 44. FIG. 7 shows a cutaway view of the preferred bearing means which is comprised of a plurality of bearings 46 positioned in circular bearing channels 48 imparted into top plate 42. A dust seal 50 is pressed between the outer perimeters of top and bottom plates 42, 44 protect bearings 46 from dust and moisture, thereby creating a sealed bearing system. It is also within, the scope of this invention that the preferred bearing means shown in FIG. 8 could be replaced with a cassette bearing, or other bearing means.

The offset positioning of box frame member 24 and its accompanying caster wheel 26, upon top plate 42, increases the rotational inertia of caster assembly 10, thereby allowing the device to easily rotate in the direction in which force is being applied to a load. It has been found that this type of rotating structure provides the ruggedness and reliability required for easy operation within a caster platform 12.

Caster assembly 10 is rotatably coupled within cavity 14 located in caster platform 12 by a coupling means 52, which can be a common nut and bolt, the bolt providing an axis of rotation for the device. Friction bearing 54 allows easy rotation of caster assembly 10 upon coupling means 52.

Figure 9:
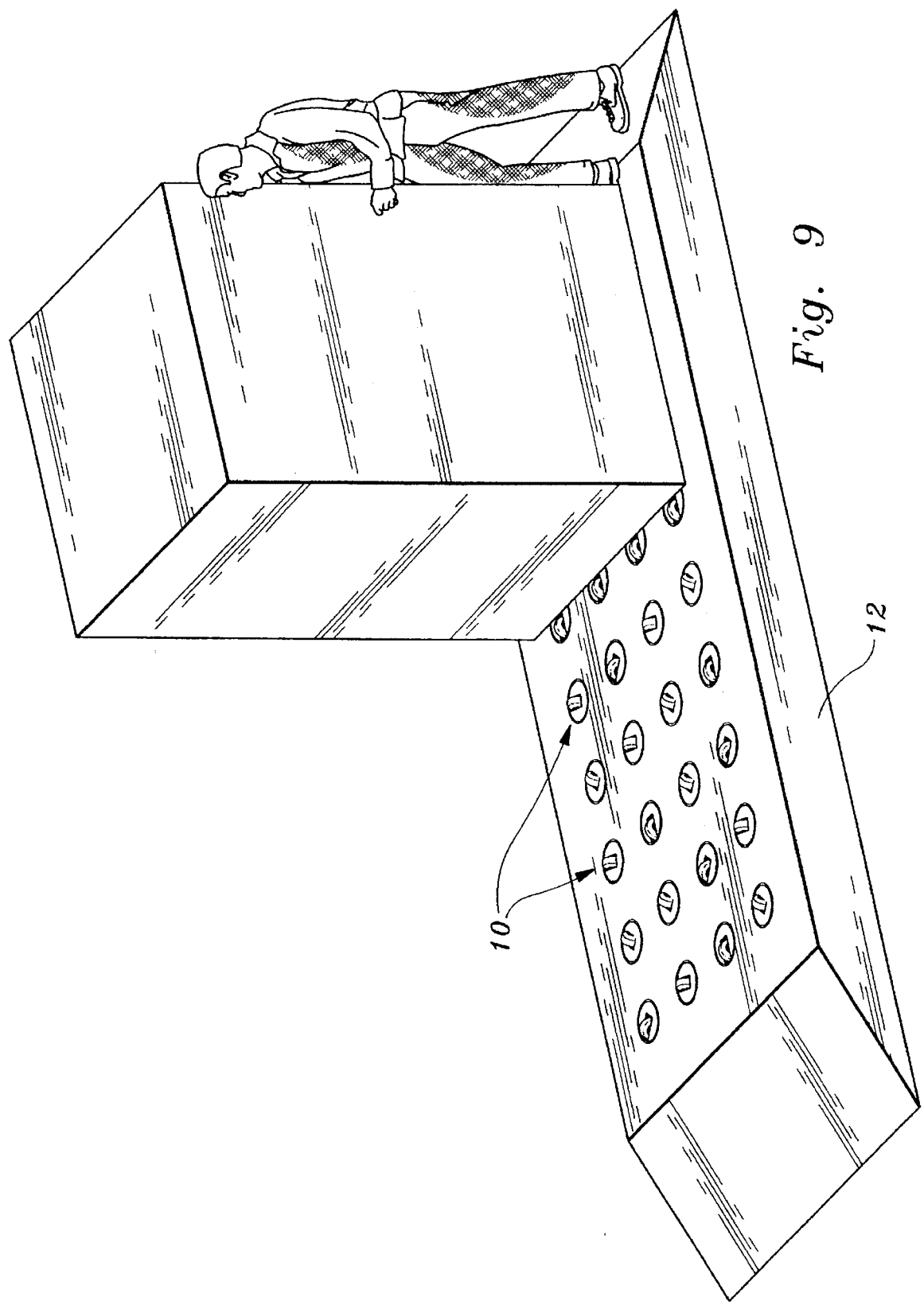
FIG. 9 is a perspective view of a plurality of caster assemblies, which comprise the present invention, mounted in a caster platform.

FIG. 9 shows a plurality of caster assemblies 10 mounted into a typical caster platform 12. Caster assemblies 10 can be readily retrofitted into existing caster platforms 12, thereby increasing their reliability and ruggedness. The amount of breakage of caster assemblies is greatly reduced by retrofitting the present invention into such caster platforms.

Accordingly, this invention provides an industrial caster assembly for caster platforms which is substantially resistant to breakage. Additionally, this caster assembly incorporates a safety lid which helps reduce risks of injury from workers operating on a caster platform using the present invention.

Finally, although the description above contains many specificities, these should not be construed as limiting the scope of the invention, but as merely providing illustrations of some of the presently preferred embodiments of this invention. Thus the scope of this invention should be determined by the appended claims and their legal equivalents.

I claim:

1. A caster assembly for caster platforms, the assembly comprising:
   a) a box frame member;
   b) a caster wheel, said caster wheel rotatably supported within said box frame member;
   c) said caster wheel mounted protrudingly above said box frame member;
   d) a rotatable platform means for affixing to said box frame member, said box frame member rotatable thereon;
   e) a safety lid, said safety lid coupled to said box frame member and positionable upon said box frame member between an opened and a closed position; and
   g) coupling means for coupling said caster assembly to a caster platform.

2. The caster assembly as recited in claim 1, wherein said rotatable platform means further comprises a circular top plate, a circular bottom plate, and a bearing means disposed between said top and bottom plates.

3. The caster assembly as recited in claim 2, wherein said box frame member is affixed to said circular top plate member in an offset position.

4. The caster assembly as recited in claim 3, wherein said safety lid further comprises a cutout imparted forwardly therein, said cutout intimately surrounding said caster wheel with said lid in a closed position.

5. A caster assembly, the assembly comprising:
   a) a box frame member, said box frame member including a hollow cavity defined by four walls;
   b) a caster wheel, said caster wheel rotatably supported within said cavity by an axle means mounted in two of said walls;
   c) said caster wheel protruding slightly above said box frame member;
   d) a rotatable platform comprised of a circular top plate, a circular bottom plate, and a bearing means disposed between said top and bottom plates;
   e) said box frame member affixed to said top circular plate in an offset position;

f) a safety lid, said lid comprising a cutout imparted forwardly therein, said cutout intimately surrounding said caster wheel with said lid in a closed position; and g) Coupling means for coupling said caster assembly to a caster platform.

6. In combination:

a) A caster assembly, the assembly comprising:
 i) a box frame member;
 ii) a caster wheel, said caster wheel rotatably supported within said box frame member;
 iii) said caster wheel mounted protrudingly above said box frame member;
 iv) a rotatable platform means for affixing to said box frame member, said box frame member rotatable thereon;
 v) a safety lid, said safety lid coupled to said box frame member and positionable upon said box frame member between an opened and a closed position; and
 vi) coupling means for coupling said caster assembly to a caster platform; and b) a caster platform, said platform comprised of a plurality of cavities, said cavities coupling a plurality of said caster assemblies therein.

7. The combination as recited in claim 6, wherein said rotatable platform means further comprises a circular top plate, a circular bottom plate, and a bearing means disposed between said top and bottom plates.

8. The combination as recited in claim 7, wherein said box frame member is affixed to said circular top plate member in an offset position.

9. The combination as recited in claim 8, wherein said safety lid further comprises a cutout imparted forwardly therein, said cutout intimately said surrounding said caster wheel with said lid in a closed position.

* * * * *